United States Patent
Fuchs et al.

(10) Patent No.: US 12,346,469 B2
(45) Date of Patent: Jul. 1, 2025

(54) METHOD FOR ACCESS MANAGEMENT OF A WIND TURBINE CONTROLLER OF A WIND TURBINE AS WELL AS WIND TURBINE CONTROLLER AND WIND TURBINE FOR THE METHOD

(71) Applicant: Wobben Properties GmbH, Aurich (DE)

(72) Inventors: Andreas Fuchs, Hanerau-Hademarschen (DE); Harald Gehl, Neumünster (DE)

(73) Assignee: Wobben Properties GmbH, Aurich (DE)

( * ) Notice: Subject to any disclaimer, the term of this patent is extended or adjusted under 35 U.S.C. 154(b) by 267 days.

(21) Appl. No.: 18/066,826

(22) Filed: Dec. 15, 2022

(65) Prior Publication Data
US 2023/0195920 A1 Jun. 22, 2023

(30) Foreign Application Priority Data
Dec. 17, 2021 (EP) .................................... 21215563

(51) Int. Cl.
*G06F 21/62* (2013.01)
*F03D 7/02* (2006.01)

(52) U.S. Cl.
CPC .......... *G06F 21/6218* (2013.01); *F03D 7/02* (2013.01)

(58) Field of Classification Search
CPC ............................. G06F 21/6218; F03D 7/02

USPC ........................................................ 726/27
See application file for complete search history.

(56) References Cited

U.S. PATENT DOCUMENTS

| | | | |
|---|---|---|---|
| 2009/0125129 A1 | 5/2009 | Eldridge et al. | |
| 2017/0310483 A1* | 10/2017 | Nagao | ..................... G06F 21/44 |
| 2020/0213315 A1* | 7/2020 | Paraggio | .............. G05B 19/042 |
| 2020/0387747 A1* | 12/2020 | Cha | ........................ G06F 18/214 |
| 2021/0388816 A1* | 12/2021 | Rust | ........................ F03D 17/00 |

FOREIGN PATENT DOCUMENTS

| | | | |
|---|---|---|---|
| EP | 3515035 A1 | 7/2019 | |
| WO | WO 2014153673 A1 | 10/2014 | |

* cited by examiner

*Primary Examiner* — Linglan Edwards
*Assistant Examiner* — Phuc Pham
(74) *Attorney, Agent, or Firm* — Seed IP Law Group LLP

(57) ABSTRACT

A method for the access management of a wind turbine controller of a wind turbine with an operating software. The method comprises receiving a user identification with one of several user interfaces and assigning the user identification or a portion of the user identification to an access group. One or several authorization groups of an overall number of authorization groups is allocated to the access group, and one or several output value storage locations and/or input value storage locations are allocated to each authorization group. The method further encompasses allowing an access from the user interface to all output value storage locations and/or input value storage locations that are allocated to the assigned access group via the authorization groups. The disclosure further relates to a computer product, a wind turbine controller, and a wind turbine with a wind turbine controller.

15 Claims, 2 Drawing Sheets

METHOD FOR ACCESS MANAGEMENT OF A WIND TURBINE CONTROLLER OF A WIND TURBINE AS WELL AS WIND TURBINE CONTROLLER AND WIND TURBINE FOR THE METHOD

BACKGROUND

Technical Field

The invention relates to a method for the access management of accesses by users, such as service personnel, to a wind turbine controller. The invention also relates to a wind turbine controller for implementing the method, as well as to a computer program product that is or is part of an operating software of a wind turbine controller. The invention further comprises a wind turbine for implementing the method.

Description of the Related Art

Provided, according to prior art, are accesses, such as control and read accesses, by a user, such as by an operator, service personnel or a manufacturer, to a wind turbine or several wind turbines, for example which can also be organized as a wind farm. A wind farm regulator allocated to the wind farm can also be used to access several wind turbines organized as a wind farm. As a consequence, control and read accesses to individual wind turbines of a wind farm are often also realized as read and control accesses via a wind farm regulator of the wind farm.

In an access that is a read access, for example, a user can read or query current operating data, such as the energy currently being fed into the supply network. As a consequence, read accesses are predominantly to be regarded as the kind of accesses that involve no intervention in wind turbine operation. For example, a read access does not allow a user to make any changes to operating parameters of a wind turbine. Therefore, read accesses are to be classified as noncritical with respect to operation, and in particular to a supply network with which the wind turbine being read accessed is connected.

By contrast, accesses that constitute control accesses make it possible to affect the operation of the wind turbine or the wind farm regulator directly or indirectly, e.g., by modifying the operating parameters. For example, operating parameters are controlled variables and the like. For example, a control access, which can also be referred to as a write access, makes it possible to also turn one or several wind turbines on or off, or to vary a voltage or frequency of energy currently being generated by the wind turbine(s) and fed into a connected supply network. Therefore, control accesses or write accesses involve accesses critical for operation. In particular given an improper control of a wind turbine, the wind turbine can be damaged, or a supply network connected with the wind turbine can be negatively influenced.

According to prior art, accessing a wind turbine controller or a wind farm regulator therefore requires that a user be authenticated with respect to the wind turbine or wind farm regulator, so as to permit access only to authorized users. For example, a user is authenticated according to prior art by transferring a tuple comprised of a password and user code, with which the user identifies themselves to the wind turbine or wind farm regulator. Transfer to the wind turbine or wind farm regulator thereby gives the user control and read accesses.

It is here common to grant a user specific accesses depending on their user data for authentication. This means that, in the usual case where several different users can access a wind turbine, each user is allowed varying rights with regard to write and/or read accesses. The possible accesses allocated to a user are filed in an access manager of the wind turbine, and are retrieved from the access manager following a user authentication.

However, user authorization routinely changes over the service life of a wind turbine. For example, a change in the operating software or even the operating hardware of a wind turbine can result in modified or new read and control accesses, which must be allocated to one or several of the users. This often requires that the rights of a plurality of users be changed in the access manager.

Since adjusting the user rights in the access manager locally in the wind turbine is a very complicated process, attempts have already been made to organize and also update an access manager for a plurality of wind turbines externally, i.e., at a central location outside of the wind turbine, for example a control room. However, frequently changing framework conditions of individual wind turbines have in recent times required hardware as well as software adjustments to individual wind turbines in order to satisfy these conditions. As a consequence, an access manager organized in a higher instance no longer offers any efficiency advantages given the individual requirements on separate wind turbines.

BRIEF SUMMARY

Provided is a simplified access manager for accessing a wind turbine, which preferably allows the user rights to be easily adjustable to individual changes in an operating hardware and operating software of a wind turbine. Proposed is a method for the access management of a wind turbine controller of a wind turbine with an operating software. The method initially comprises receiving a user identification with one of several user interfaces. This means that several user interfaces of a wind turbine controller are provided, and one of these user interfaces receives a user identification from a user who wishes to identify themselves via the user interface in order to receive access to the wind turbine controller. For example, a user identification takes place by entering a username and a password of the user.

According to the method, the user identification or a portion of the user identification, e.g., meaning a received username, is assigned to an access group. One or several authorization groups of an overall number of authorization groups is allocated to this access group. One or several output value storage locations and/or input value storage locations of the operating software are in turn allocated to each authorization group.

This means that output value storage locations are provided in the operating software so as to preferably prepare parameters or the like that indicate an operating state, and hence can be referred to as operating parameters, for display or further processing as output values. The output value storage locations can be read by an authorized user, or the parameter or output value can be retrieved. By contrast, input value storage locations correspond to storage locations in the operating software that serve to receive or accept write accesses, i.e., to also include in particular control accesses. A parameter or value entered into the input value storage location thus serves to adjust the controller.

Further provided are authorization groups, wherein each authorization group has allocated to it one or several input value storage locations and/or one or several output value storage locations. This means, for example, that individual modules of the operating software provided for specific technical tasks during operation of a wind turbine are allocated to an authorization group based on their task. This means, for example, that an authorization group can be provided that exclusively enables accesses to adjustment drives of the rotor blades. For example, another authorization group is used to allow accesses for regulating the supply of energy into a network. For example, individual technical tasks can also provide for different authorization groups, which allow only read accesses or only write accesses to individual technical areas. In this way, each output value storage location and each input value storage location is preferably allocated to at least one, but especially preferably several authorization groups. Defined in addition are access groups that are allocated to one or several authorization groups from the total amount of authorization groups.

The disclosure then allows access from the user interface to all output value storage locations and/or input value storage locations that are allocated to the assigned access group via the authorization groups.

Therefore, an access group is allocated to the user after they have been identified with the user identification. Authorization groups are allocated to the access group, wherein these authorization groups are in turn allocated to the input value storage locations and/or the output value storage locations, which a user can then access.

The method makes it possible to allocate new input value storage locations or output value storage locations to individual authorization groups in the event of hardware modifications. Since the authorization groups remain or are allocated to users via the access groups, only the corresponding authorization group must thus be adjusted given a change in the hardware and/or the software so as to keep this technical area accessible to the same user group.

On the other hand, by adjusting a single access group, for example by adding authorization groups or removing authorization groups, the method makes it possible to simultaneously adjust access to an adjusted software and/or hardware for several users to whom the same access group is allocated. Therefore, the same access groups can also be allocated to several users, thus also making it possible to manage the access rights of a single user via simple allocation to a corresponding access group.

According to a first embodiment, a localization identifier is received with the user identifier. The localization identifier indicates at least whether the user identification was received from a user interface lying within the wind turbine or from a user interface of a remote computer, for example via a control center or a wind farm regulator, by means of a wind turbine interface. Therefore, the operating software can also coordinate access rights as a function of a position of a user, since the localization identifier can be used to determine the location from which a user wishes to access the wind turbine controller.

According to an embodiment of the method, in a case where the localization identifier indicates that the user identification was received from a user interface lying within the wind turbine, it also indicates from which of several user interfaces lying in the wind turbine the user identification was received. A user interface in a tower of the wind turbine, a user interface in a nacelle of the wind turbine, and especially preferably a user interface in a rotor hub of the wind turbine each preferably have different localization identifiers, so that the operating software can assign corresponding access rights as a function of the localization identifier.

According to another embodiment, a received user identification is allocated to one of several different access groups as a function of the localization identifier received along with it. This means that the localization identifier can be used to allocate different access groups to one and the same user as a function of the identified user interface. For example, it is therefore possible to write when an access takes place from an interface within the wind turbine on specific input value storage locations that are only allocated to one authorization group of a specific access group. Therefore, it is especially preferably provided that specific write accesses only be possible via individual predefined interfaces of the wind turbine. This makes it possible to prevent in particular safety-critical accesses to a wind turbine from a remote location, and hence also to a plurality of wind turbines simultaneously, for example so as to intentionally attack a supply network in this way. Also possible from a safety aspect is to allocate different access groups to one and the same user within the wind turbine as a function of which user interface the user wishes to access. For example, during an access via a user interface in the rotor hub, a brake cannot be released or an operation cannot be resumed for safety reasons via an access correspondingly restricted by the access group.

According to another embodiment, an active status can be assigned with the operating software. The active status can only be assigned at any point in time for a single user interface of the several user interfaces. Access via a user interface to an input value storage interface, i.e., a control or write access, is only permitted via a user interface if the operating software of the user interface has assigned the active status. The active status is preferably assigned after the active status was previously requested via the user interface.

In this way, it can be ensured that several users will not simultaneously initiate a write access to an input value storage location, i.e., that several write accesses will not take place simultaneously. In particular, requiring that a user request an active status in advance also ensures that an active status will only be allocated to a user interface, and thus no longer be available for other user interfaces, if a user actually wants a control or write access, i.e., an access to an input value storage location. An active status is thus preferably not automatically assigned if a user reidentifies themselves after the active status had already been assigned for an identified user. As a result, an unnecessary blocking of the active status can be avoided.

According to another embodiment, a respective priority is allocated to each localization identifier in the operating software. After a request for an active status has been received from a user interface for a new access, a check is performed to determine whether the active status was already assigned to another user interface for a previously requested access. In a case where the active status was assigned to the other user interface, the active status is withdrawn from the other user interface if the localization identifier of the user interface for the new access has a higher priority than the localization identifier of the other user interface. The active status is then allocated to the user interface for the new access in accordance with the request. By contrast, the active status is not withdrawn from the other user interface if the localization identifier of the other user interface has the same or a higher priority as/than the localization factor of the user interface for the new access.

In this case, a message is issued to the user interface for the new access, and the other user interface keeps the active status.

For example, when the wind turbine with an active status is accessed from a local user interface of the wind turbine, this ensures that the local access will not be interrupted by the access from outside from a user interface which is at remote location, and thus preferably has allocated to it a lower priority via the localization identifier. In particular for service teams that schedule an access on site, an on-site access is thereby not interrupted by a remote access. On the other hand, a local access can also be instantly performed given correspondingly allocated priorities, even if an access from a remote computer is actually still ongoing, which is then interrupted.

According to another embodiment, a respective priority is allocated to each access group. Upon receipt of a request for an active status from a user interface, from which a user identification for a new access was received, a check is performed to determine whether the active status was assigned for another user interface. In a case where the active status was assigned for another user interface, the active status is withdrawn from the other user interface if the access group of the new access allocated to the user identification has a higher priority than the access group of the received user identification from the other user interface. Accordingly, the active status is then assigned to the user interface for the new access.

As a consequence, users can be prioritized via the access groups and their prioritization. In particular in a case where several accesses can be performed from user interfaces with identically prioritized localization identifiers, the active status can be assigned in a prioritized manner to users to whom a higher priority was allocated via their access group.

According to another embodiment, an active status is withdrawn after the assignment upon expiration of a specific period. Alternatively or additionally, the active status can be returned by releasing the active status with the user interface to which the active status was assigned. This prevents the active status from remaining with a user interface beyond a period in which an access to the wind turbine controller is actually required. In particular if high priorities are allocated to such an existing access, this would unnecessarily prevent an access from another user interface which likewise requires the active status.

According to another embodiment, the operating software comprises several software modules. Several or all communications outputs of the software modules are each prepared as output value storage locations in the operating software, and several or all communications inputs of the software modules are each prepared as input value storage locations. As a consequence, the authorization groups can be used within the operating software to access the software modules for influencing the function of the software modules and/or to read parameters of the software modules.

According to another embodiment, a user interface is used to display data of the output value storage locations that are allocated to the assigned access group via the authorization groups. Additionally or alternatively, the user interface is used to receive data for the input value storage locations that are allocated to the assigned access group via the authorization groups. The user interface is preferably equipped as an input terminal, for example in the form of a graphic interface, so as to display data of the output value storage locations according to the access group and prepare input fields for receiving data that can be written in the input value storage locations. In particular if it offers a graphic illustration means, the user interface preferably also has a request field for requesting the active status. In addition, such a graphic illustration means is preferably also used to display whether the active status is currently allocated to the user interface.

According to another embodiment, at least one identical set of output value storage locations and/or input value storage locations is allocated to several different user groups. This means that there are several user groups which, while they have different output value storage locations and/or input value storage locations allocated to them as a whole, always have allocated to them an identical set of output value storage locations and/or input value storage locations. This makes it possible to form access groups through different user groups without establishing new user groups.

According to another embodiment, provided is a computer program product that comprises instructions which, when performed on a wind turbine controller, implement the method according to one of the aforementioned embodiments.

In addition, provided is a wind turbine controller that is set up to implement the method according to one of the aforementioned embodiments, in particular via a computer program product according to the disclosure.

In addition, provided is a wind turbine with a wind turbine controller according to the disclosure.

According to an embodiment of the wind turbine, the wind turbine comprises at least one user interface in the wind turbine, and at least one user interface lying outside of the wind turbine.

In particular, the user interface outside of the wind turbine is formed by a remote computer.

BRIEF DESCRIPTION OF THE SEVERAL VIEWS OF THE DRAWINGS

Additional embodiments may be gleaned from the exemplary embodiments explained in more detail on the figures. Shown here on:

FIG. 1 is a wind turbine, and on

DETAILED DESCRIPTION

Figure 1:
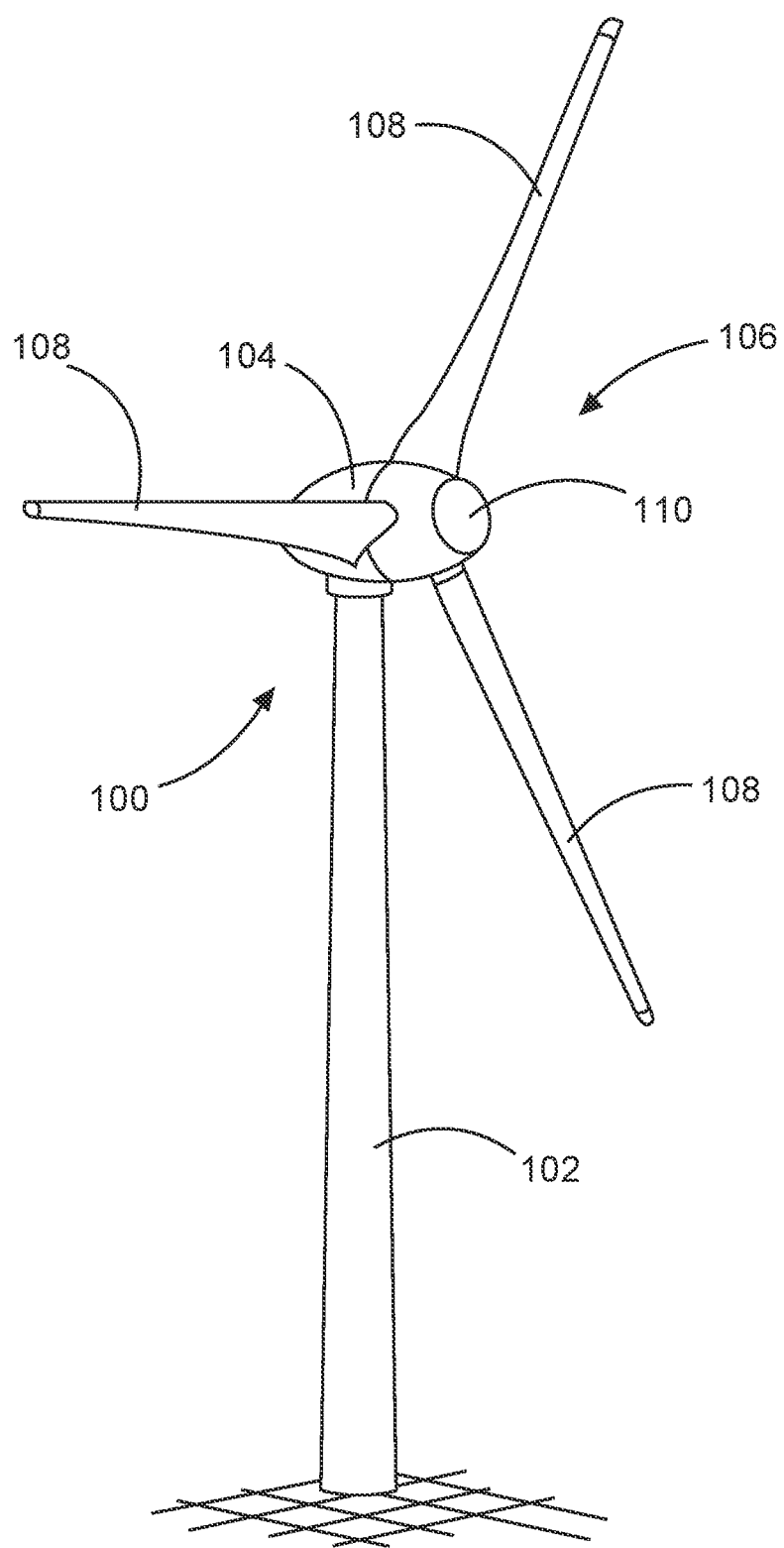

FIG. 1 shows a schematic view of a wind turbine 100 according to the invention. The wind turbine 100 has a tower 102 and a nacelle 104 on the tower 102. Provided on the nacelle 104 is an aerodynamic rotor 106 with three rotor blades 108 and a spinner 110. During operation of the wind turbine 100, the wind imparts a rotational motion to the aerodynamic rotor 106, which thus also turns an electrodynamic rotor or runner of a wind turbine generator, which is directly or indirectly coupled with the aerodynamic rotor 106. The electric wind turbine generator is arranged in the nacelle 104, and generates electric energy. The pitch angles of the rotor blades 108 can be changed by pitch motors on the rotor blade roots of the respective rotor blades 108.

Figure 2:
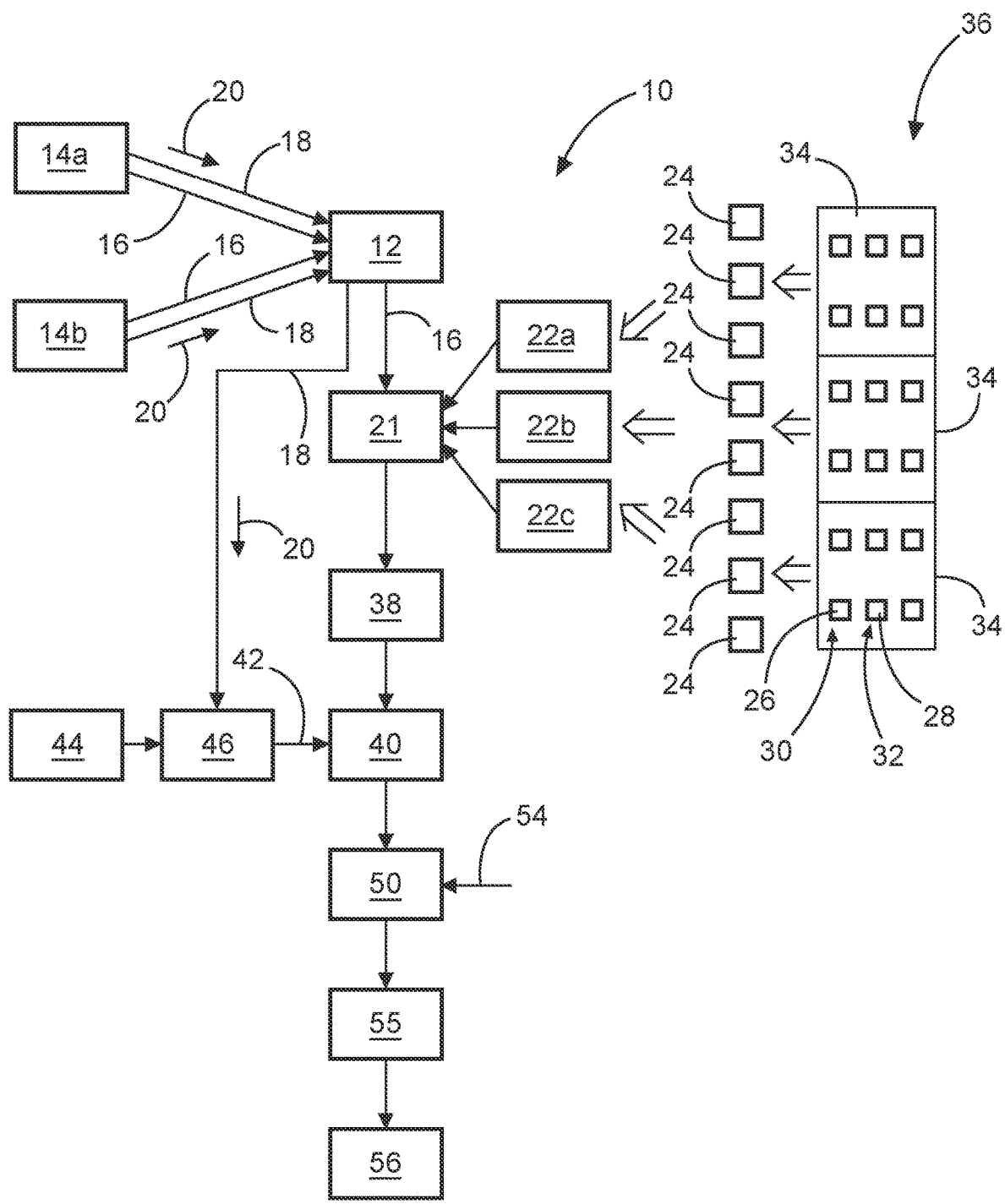
FIG. 2 are the steps of the method according to an exemplary embodiment.

FIG. 2 shows a method 10 for the access management of a wind turbine controller of a wind turbine 100 with an operating software. In a step 12, one of a plurality of user interfaces 14*a*, 14*b* receives a user identification 16 and a localization identifier 18. The localization identifier 18 has a priority 20. After receipt at step 12, an access group 22*a*, 22*b*, 22*c* of a plurality of access groups 22*a*, 22*b*, 22*c* that depends on the user identifier 16 is assigned to the received user identifier in step 21.

The access groups 22a, 22b, 22c comprise a plurality of authorization groups 24, wherein a plurality of output value storage locations 26 and input value storage locations 28 are allocated to each authorization group 24. The input value storage locations 28 as well as the output value storage locations 26 correspond to communications inputs 32 and communications outputs 30 of different software modules 34 of the operating software 36 of the wind turbine controller.

In the following step 38, the user interface 14a, 14b is allowed to access all output value storage locations 26 and input value storage locations 28 allocated to the assigned access group 22a, 22b, 22c via the allocated authorization groups 24. An active status 42 is requested in step 40. To this end, a check is initially performed in step 44 to determine whether the active status 42 has already been assigned, specifically for another user interface 14a, 14b. If the active status 42 has already been assigned, and the new access has a higher priority 20, the active status 42 is withdrawn from the other user interface 14a, 14b in step 46, and assigned to the user interface 14a, 14b for the new access. For this purpose, the priority 20 is compared based on the localization identifier 18 received in step 12 with a priority 20 of the localization identifier 18 of the other user interface 14a, 14b.

In step 50, an access is then made via the user interface 14a, 14b. In step 52, a check is performed to determine whether a predefined duration 54 has expired. The active status 42 is withdrawn in step 55 if the duration 54 has expired. In step 56, a logoff by the user from the user interface 14a, 14b is received, and the access is terminated.

REFERENCE LIST

10 Method
12 Receiving a user identification and localization identifier
14a User interface
14b User interface
16 User identification
18 Localization identifier
20 Priority
21 Assigning the user identification to an access group
22a Access group
22b Access group
22c Access group
24 Authorization groups
26 Output value storage locations
28 Input value storage locations
30 Communications outputs
32 Communications inputs
34 Software modules
36 Operating software
38 Allowing access to output value storage locations and input value storage locations
40 Requesting active status
42 Active status
44 Checking to determine different assignment of active status
46 Withdrawing active status given a higher prioritization
50 Access
52 Checking predefined duration
54 Predefined duration
55 Withdrawing active status
56 User logoff and access termination
100 Wind turbine
102 Tower
104 Nacelle
106 Aerodynamic rotor
108 Rotor blades
110 Spinner The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for access management of a wind turbine controller of a wind turbine with an operating software, the method comprising:
receiving, by the wind turbine controller, a user identification using a first user interface of a plurality of user interfaces;
receiving a localization identifier with the user identification, wherein the localization identifier indicates at least whether the first user interface is within the wind turbine or is part of a remote computer via a wind turbine interface, wherein the user identification is allocated to one of a plurality of different access groups as a function of the localization identifier received with the user identification;
assigning, by the wind turbine controller, at least a portion of the user identification to an access group, wherein one or more authorization groups of an overall plurality of authorization groups is allocated to the access group, and wherein one or more output value storage locations or input value storage locations are allocated to each authorization group; and
allowing, by the wind turbine controller, access from the first user interface to all output value storage locations or input value storage locations that are allocated to the assigned access group via the plurality of authorization groups.

2. The method according to claim 1, wherein the first user interface is within the wind turbine, wherein the localization identifier indicates from which of the plurality of user interfaces in the wind turbine the user identification was received, wherein different localization identifiers are received from a user interface in a tower of the wind turbine and a user interface in a nacelle of the wind turbine.

3. The method according to claim 1, comprising assigning an active status, wherein the active status is configured to be assigned at any point in time for a single user interface of the plurality of user interfaces, and access, via the first or second user interface, to an input value storage location is permitted only if the operating software of the user interface has assigned the active status.

4. The method according to claim 3, wherein a respective priority is allocated to each localization identifier, and after a request for an active status has been received from a user interface for a new access, performing a check to determine whether the active status was assigned for another user interface for a previously requested access, and in a case where the active status was assigned to a second user interface of the plurality to user interfaces, the active status is withdrawn from this other user interface if the localization identifier of the user interface for the new access has a higher priority than the localization identifier of the other user interface.

5. The method according to claim 1, wherein a respective priority is allocated to each access group, and upon receipt of a request for an active status from a user interface, from which a user identification for a new access was received, performing a check to determine whether the active status was assigned for another user interface, and in a case where the active status was assigned, the active status is withdrawn from the other user interface if the access group of the new access allocated to the user identification has a higher priority than the access group of the received user identification from the other user interface.

6. The method according to claim 3, wherein an active status is withdrawn after the assignment upon expiration of a specific period, or returned through release from a user interface to which the active status is assigned.

7. The method according to claim 1, wherein the operating software has a plurality of software modules, wherein at least a portion of communications outputs of the software modules are each prepared as an output value storage location, and at least a portion of communications inputs of the software modules are each prepared as an input value storage location.

8. The method according to claim 1, comprising displaying, on a user interface, data of the output value storage locations that are allocated to the assigned access group via the plurality of authorization groups.

9. The method according to claim 1, wherein the user interface is used to receive data for the input value storage locations that are allocated to the assigned access group via the plurality of authorization groups.

10. The method according to claim 1, wherein at least one identical set of output value storage locations and/or input value storage locations is allocated to a plurality of different user groups.

11. A non-transitory computer readable medium that comprises instructions which, when performed on a wind turbine controller, are configured to implement the method according to claim 1.

12. A wind turbine controller comprising the computer readable storage medium according to claim 11.

13. A wind turbine comprising a tower, a nacelle, and the wind turbine controller according to claim 12.

14. The wind turbine according to claim 13, comprising at least one user interface in the wind turbine, and at least one user interface outside of the wind turbine for access to an operating software of the wind turbine.

15. The wind turbine according to claim 14, wherein the at least one user interface outside of the wind turbine is a remote computer.

* * * * *